United States Patent
Mayer et al.

(10) Patent No.: US 11,435,729 B2
(45) Date of Patent: Sep. 6, 2022

(54) METHOD FOR OPERATING A FIELD DEVICE

(71) Applicant: Endress+Hauser Process Solutions AG, Reinach (CH)

(72) Inventors: Michael Mayer, Oberwil (CH); Jürg Bünzli Wurzer, Riehen (CH)

(73) Assignee: ENDRESS+HAUSER PROCESS SOLUTIONS AG, Reinach (CH)

( * ) Notice: Subject to any disclaimer, the term of this patent is extended or adjusted under 35 U.S.C. 154(b) by 419 days.

(21) Appl. No.: 16/608,499

(22) PCT Filed: Apr. 10, 2018

(86) PCT No.: PCT/EP2018/059100
§ 371 (c)(1),
(2) Date: Oct. 25, 2019

(87) PCT Pub. No.: WO2018/197197
PCT Pub. Date: Nov. 1, 2018

(65) Prior Publication Data
US 2020/0201296 A1      Jun. 25, 2020

(30) Foreign Application Priority Data
Apr. 27, 2017   (DE) .................... 10 2017 109 030.4

(51) Int. Cl.
*G05B 19/418*      (2006.01)
*G06F 9/451*       (2018.01)
(Continued)

(52) U.S. Cl.
CPC ......... *G05B 19/4185* (2013.01); *G06F 9/445* (2013.01); *G06F 9/451* (2018.02);
(Continued)

(58) Field of Classification Search
CPC ............ G05B 19/4185; G05B 19/0428; G05B 2219/25428; G05B 2219/31121;
(Continued)

(56) References Cited

U.S. PATENT DOCUMENTS

2002/0152289 A1   10/2002   Dube
2003/0200292 A1   10/2003   Kemp et al.
(Continued)

FOREIGN PATENT DOCUMENTS

DE    102005051580 A1 *  5/2007  ........... G01F 15/063
DE    202012009447 U1    10/2012
(Continued)

OTHER PUBLICATIONS

Box et al., Simple Object Access Protocol (Soap) 1.1, W3, 27 pages, Aug. 2000. (Year: 2000).*
(Continued)

*Primary Examiner* — Patrice L Winder
(74) *Attorney, Agent, or Firm* — Mark A. Logan; Endress+Hauser (USA) Holding Inc.

(57) ABSTRACT

The present disclosure resides in a method for operating, installed in an automated plant, a field device, which is connected for communication with a field access unit by means of a first communication network, especially by means of a fieldbus of automation technology, comprising: invoking a link of the field device in a client computer, wherein the link is composed at least of a protocol field and a parameter field, wherein the invoking of the link initiates steps as follows: starting a first frame application associated with the protocol field of the link; transferring the link to the first frame application and extracting information contained in the parameter field by the first frame application; configuring a communication path between the client computer and the field device via the field access unit with application
(Continued)

of the information; opening a device driver or a device description in the first frame application.

14 Claims, 2 Drawing Sheets

(51) Int. Cl.
*G06F 9/445* (2018.01)
*H04L 12/28* (2006.01)
*H04L 12/40* (2006.01)
*H04L 41/0253* (2022.01)
*H04L 41/0803* (2022.01)
*H04L 43/50* (2022.01)

(52) U.S. Cl.
CPC .... *H04L 12/2816* (2013.01); *H04L 12/40006* (2013.01); *H04L 41/0253* (2013.01); *H04L 41/0803* (2013.01); *H04L 43/50* (2013.01); *H04L 2012/40208* (2013.01)

(58) Field of Classification Search
CPC ... G05B 19/41855; G06F 9/445; G06F 9/451; H04L 12/2816; H04L 12/40006; H04L 41/0253; H04L 41/0803; H04L 43/50; H04L 2012/40208; H04L 2012/40215; H04L 2012/40221; H04L 12/281; Y02P 90/80
See application file for complete search history.

(56) References Cited

U.S. PATENT DOCUMENTS

| | | | | |
|---|---|---|---|---|
| 2010/0114334 | A1* | 5/2010 | Krumsiek | G05B 19/042 700/3 |
| 2012/0079125 | A1* | 3/2012 | Nixon | H04L 67/12 709/230 |
| 2014/0358251 | A1* | 12/2014 | Smith | G05B 19/4185 700/17 |
| 2015/0113423 | A1 | 4/2015 | Giango et al. | |
| 2016/0142283 | A1* | 5/2016 | Bennett | H04L 67/16 709/223 |
| 2018/0352436 | A1* | 12/2018 | Spiegel | G06F 21/85 |
| 2019/0042819 | A1* | 2/2019 | Agarwal | G05B 19/41835 |

FOREIGN PATENT DOCUMENTS

| | | | | |
|---|---|---|---|---|
| EP | 3165975 | A1 * | 5/2017 | ........ G05B 19/042 |
| GB | 2479036 | A * | 9/2011 | ........ G05B 19/408 |
| GB | 2479036 | A | 9/2011 | |
| WO | 2005101149 | A2 | 10/2005 | |

OTHER PUBLICATIONS

François Jammie et al. 2005. Service-oriented device communications using the devices profile for web services. In Proceedings of the 3rd international workshop on Middleware for pervasive and ad-hoc computing (MPAC '05). Association for Computing Machinery, New York, NY, USA, 1-8. (Year: 2005).*

Billock, Greg, Hawkins, James and Kinlan, Paul, W3C, Web Intents, W3C Editor's Draft Sep. 11, 2012, 8 pp. (https://dvcs.w3.org/hg/web-intents/raw-file/tip/spec/Overview.html).

* cited by examiner

METHOD FOR OPERATING A FIELD DEVICE

CROSS-REFERENCE TO RELATED APPLICATIONS

The present application is related to and claims the priority benefit of German Patent Application No. 10 2017 109 030.4, filed on Apr. 27, 2017 and International Patent Application No. PCT/EP2018/059100 filed on Apr. 10, 2018, the entire contents of which are incorporated herein by reference.

TECHNICAL FIELD

The invention relates to a method for operating, installed in an automated plant, a field device, which is connected for communication with a field access unit, especially with a computing unit, a gateway or an edge device, by means of a first wired or wirelessly embodied, communication network, especially by means of a fieldbus of automation technology.

BACKGROUND

Known from the state of the art are field devices, which are used in industrial facilities. Field devices are often used in automation technology, as well as in manufacturing automation. Referred to as field devices are, in principle, all devices, which are applied near to the process and which deliver, or process, process relevant information. Thus, field devices are used for registering and/or influencing process variables. Serving for registering process variables are measuring devices utilizing sensors. These are used, for example, for pressure- and temperature measurement, conductivity measurement, flow measurement, pH measurement, fill level measurement, etc. and register the corresponding process variables, pressure, temperature, conductivity, pH value, fill level, flow, etc. Used for influencing process variables are actuators. These are, for example, pumps or valves, which can influence the flow of a liquid in a tube or the fill level in a container. Besides the above mentioned measurement devices and actuators, referred to as field devices are also remote I/Os, radio adapters, and, in general, devices, which are arranged at the field level.

A large number of such field devices are produced and sold by the Endress+Hauser group of companies.

In modern industrial facilities, field devices are, as a rule, connected with superordinated units via communication networks, such as, for example, fieldbusses (Profibus®, Foundation® Fieldbus, HART®, etc.). The superordinated units are control units, such as, for example, a PLC (programmable logic controller). The superordinated units serve, among other things, for process control, as well as for start-up of the field devices. The measured values registered by the field devices, especially by their sensors, are transmitted via the particular bus system to one (or, in given cases, a number of) superordinated unit(s), which, in given cases, process the measured values further and then forward the result to the control station of the plant. The control station serves for process visualizing, process monitoring and process control via the superordinated units. In addition, also a data transmission from the superordinated unit via the bus system to the field devices is required, especially for configuration and parametering of field devices as well as for operating actuators.

For servicing the field devices, corresponding operating programs (operating tools) are necessary, which run either on their own in the superordinated units (Endress+Hauser FieldCare, Pactware, AMS Fisher-Rosemount, PDM Siemens) or are integrated in applications of the control station (Siemens PCS7, ABB Symphony, Emerson Delta V). The terminology, "servicing", means, among other things, a parametering of the field device, an updating of the field device and/or a querying and visualizing of process data and/or diagnostic data of the field device.

The integration of field devices into such operating programs occurs via device drivers, or via device descriptions. These are provided by the device manufacturers, in order that the superordinated units, or the operating programs running in these superordinated units, can recognize and interpret the meaning of the information delivered from the field devices. Such an operating program, into which the device descriptions, or device drivers, are loaded, is also referred to as a frame application.

For a comprehensive servicing of the field devices, special device drivers, so called DTMs (Device Type Managers), which correspond to the FDT (Field Device Tool) specifications, are obtainable. Many field device manufacturers deliver DTMs for their field devices. The DTMs encapsulate all variables and functions of the field devices and offer, most often, a graphical user interface for servicing the devices within the frame application.

Besides the superordinated units, frequently used for servicing field devices are service units in the form of client computers, in which a corresponding frame application runs. These client computers are, for example, laptops, however, also mobile end devices, such as, for example, tablet PCs. They are connected with a fieldbus access unit connected with the fieldbus network for communication with the field devices. A frame application is likewise running in the fieldbus access unit. With the help of a special communication driver, for example, the "YCommDTMs" available from the applicant for the frame application "Fieldcare", it is possible to access the frame application of the fieldbus access unit and via this accessing to reach the field devices. For the client computer, the network infrastructure lying between field device and fieldbus access unit is completely transparent, since this must only be known to the fieldbus access unit. The client computer need only know the network address of the field device, which it would like to access.

Besides the already mentioned servicing programs, or frame applications, frequently (cloud-) applications for plant asset management (for example, "Endress+Hauser W@M") are located in the service units. In these applications for plant asset management, devices and associated data (for example, configuration data) are managed.

Here, there currently is a problem—locally installed frame applications cannot be started from the plant asset management application, even though the field device, is, indeed, visible in the plant asset management application. The operator must manually create the communication topology in the frame application, in order to have access to the field devices, this being a failure-prone and time-consuming procedure.

SUMMARY

Based on the above, an object of the invention is to provide a method, which enables simple accessing of a field device.

The object is achieved by a method for operating, installed in an automated plant, a field device, which is connected for communication with a field access unit, especially with a computing unit, a gateway or an edge device, by means of a first wired or wirelessly embodied, communication network, especially by means of a fieldbus of automation technology, comprising:

invoking a link of the field device in a client computer, wherein the link is composed at least of a protocol field and a parameter field, wherein the invoking of the link initiates steps as follows:

a) starting a first frame application, especially an FDT-frame application, an FDI-host, a DD-host or an EDD-host, associated with the protocol field of the link b) transferring the link to the first frame application and extracting at least one piece of information contained in the parameter field by the first frame application;

c) configuring a communication path between the client computer and the field device via the field access unit with application of the at least one piece of information;

d) opening a device driver associated with the field device, or a device description associated with the field device, in the first frame application.

A great advantage of the method of the invention is that the infrastructure for accessing a field device is loaded into the service unit and configured in time saving manner. All information required for this is located directly in the link.

The terminology, link, is especially a URL (Uniform Resource Locator) link. Such is composed especially of a protocol field and a data field, for example, "devconfig://Tagx/yyy". "devconfig" represents the protocol field in this example. In the registry of the operating system of the service unit, the term "devconfig" is linked with the frame application, so that an opening of a devconfig link automatically starts the frame application. The parameter field begins behind the separator "://". Individual parameters are separated here by means of forward slashes "/". After transfer of the link to the frame application, the link is parsed and the individual parameters, thus, extracted, for example, here an identifier ("TAG x") and a network address "yyy". The frame application then configures a communication path between the service unit and the field device and opens a device driver appropriate for the field device. The appropriate device driver is automatically selected especially based on the transmitted identification data. Especially, it is provided that a large number of device drivers are present in the client computer, from which the suitable device driver is selected. For the case, in which no fitting device driver is present in the client computer, it can be provided that the client computer via Internet accesses a server of the field device manufacturer and downloads an appropriate device driver.

The first frame application is especially an FDT/FDI-frame application or a DD (Device Description)- or EDD (Electronic Device Description)-host.

The first communication network, when embodied wired, is, for example, a fieldbus of automation technology, for example, a Foundation Fieldbus, Profibus PA, Profibus DP, HART, CANBus, etc. fieldbus. It can, however, also be a modern industrial communication network, for example, an "Industrial Ethernet" fieldbus, especially Profinet, HART-IP or Ethernet/IP or a communication network known from the communication field, for example, Ethernet based on the TCP/IP protocol.

In the case, in which the first communication network is embodied wirelessly, such is especially a wireless HART, Bluetooth, WiFi, ZigBee, etc. network.

Typically, the first communication network is composed of a number of network portions, so-called network levels, which are connected with one another by means of network nodes. The network portions can, in such case, be different network types and use different network protocols. The method of the invention enables not only an accessing of field devices, but also network nodes (to the extent that such permit servicing by means of the first frame application).

A network node involves a network device, which connects the individual network levels with one another. In given cases, the network nodes execute a protocol conversion between connected network levels. Depending on type of connected network levels, a network node can be, for example, a gateway, a remote IO, a link, a coupler, a protocol converter, a multiplexer, etc.

A remote-IO involves e.g. a local distributor node, to which one or more field devices or network nodes can be connected. The remote-IO serves, above all, for lessening wiring effort. Instead of each component having to be wired individually with a remote fieldbus network, a remote-IO is connected as distributor node to the communication network, and the data traffic is forwarded via the remote-IO to various field devices located in the neighborhood. In the case of a remote-IO, the feature of the local distribution of the data traffic is the main attraction.

In the case of a gateway, involved, firstly, is a coupling between different network levels. In such case, the gateway cares for a suitable implementing of the data traffic between the individual network levels. This can include a protocol conversion, but such is not an absolute requirement.

In the case of a protocol converter, in contrast, the protocol conversion is the main attraction. The incoming data traffic is converted from a first fieldbus protocol into a second fieldbus protocol, or, in the reverse direction, from the second protocol into the first protocol.

In the case of a multiplexer, extension of the available address range is the main attraction. The multiplexer provides an address range, via which a large number of devices connected to the multiplexer can be addressed. Corresponding to the address, the incoming data traffic is then routed to the desired target device.

Alternatively, the fieldbus access unit is an edge device, which has access interfaces compatible for a second frame application.

The second communication network is, for example, an Internet-/intranet connection between client computer and fieldbus access unit and can be implemented wirelessly or wired.

Field devices, which are suitable in connection with the method of the invention, have already been described above, by way of example, in the introductory part of the description.

It can, furthermore, be provided that the link has, supplementally, a path field. For example, topology information is contained In this path field. This topology information permits a faster finding of the field device, or of the node point. Examples of such topology information are, for example, the plant part and/or the network level, in which the field device is located, and/or the network node, which is superordinated to the field device/network node to be serviced.

In a first variant of the method of the invention, it is provided that the configured communication path between the client computer and the field device is established, wherein the field device is serviced by means of the first frame application via the established communication path, wherein the servicing comprises especially a querying of data produced by the field device, a parametering, or re-parametering, of the field device and/or a querying of diagnostic reports of the field device. Involved here is an "online" method, since a connection to the field device is always present. The accessing of the particular field device, or the network node, occurs by means of a special communication driver, which is embodied in the first frame application of the client computer and which accesses the second frame application embodied in the fieldbus access unit.

In a second variant of the method of the invention, it is provided that at a first point in time service commands are placed in the opened device driver and stored, wherein no connection between field device and client computer is present. Involved here is, thus, an "offline" method. The device driver does, indeed, have all functionalities ready—these are, however, not executed, since there is yet no connection to the field device. For example, the operator can by means of input screens set parameter values for parameters of the field device. These settings are then stored.

In an advantageous, further development of the second variant of the method of the invention, it is provided that at a second point in time the configured communication path between the client computer and the field device is established and the service commands are executed. The second point in time is located, in such case, after the first point in time. In the case of the above discussed parameter change, the parameter values associated with the individual parameters are transmitted to the field device and written into such. Also in this case, the accessing of the particular field device, or the network node, occurs by means of a special communication driver, which is executed in the first frame application of the client computer and which accesses the second frame application embodied in the fieldbus access unit.

In an advantageous embodiment of the method of the invention, it is provided that at least one of the following pieces of contained information in the parameter field is transferred:
  a network address of the field access unit;
  a network address of the field device;
  a network path of the field device; and
  an identifier of the field device.

Identifiers are features, with whose help a field device can be unequivocally identified. Examples of identifiers include the tag of the field device, its serial number, the manufacturer ID or a combination of these features.

In a preferred further development of the method of the invention, it is provided that the link is invoked from a Web application located in a remote server, especially a Web application executable by means of the Internet in the client computer, or from an application different from the first frame application and executable in the computer unit.

In an advantageous embodiment of the method of the invention, it is provided that the link is invoked by means of a Web browser of the client computer. For example, the link is integrated directly in a Website of a plant asset management system.

In an alternative preferred further development of the method of the invention, is provided that the link is invoked by opening a file executable in the client computer.

In an additional alternative preferred further development of the method of the invention, it is provided that the link is read-out by means of the client computer from a QR-code or from an NFC-tag. In such case, the client PC has an integrated module or a supplemental module, with whose help the QR-code or the NFC-tag is capable of being read out. In the case of the QR-code, the module is a module for registering optical information, especially a camera. In the case of an NFC-tag, the module is an NFC-reader. The NFC-tag or the QR-code is, for example, placed on the field device in the plant, where the field device is to be serviced. A service technician at the field device can establish a direct connection to the field device by reading-out the link. Alternatively, the QR-code can also be located on a plant plan or on a physical document associated with the field device, for example, a packing slip or a reference manual.

In a preferred embodiment of the method of the invention, it is provided that the at least one piece of information contained in the parameter field is transferred first to an intermediate component, which especially converts information into a data format compatible with the first frame application, and wherein the intermediate component transmits information to the first frame application.

In an advantageous embodiment of the method of the invention, it is provided that by the invoking of the link there is produced and embodied in the client computer a shell application, which initiates and coordinates the steps following the invoking of the link. A shell application sequentially executes a plurality of defined commands.

In a preferred further development of the method of the invention, it is provided that the client computer after the invoking of the link performs a plausibility check and wherein the steps following the invoking of the link are performed only in the case that the plausibility was affirmative. The plausibility check assures that the link is correctly formed and, for example, was not altered by unauthorized persons. It can also be provided that a test sum is included in the parameter field of the link. Only in the case of correct test sum is it assured that the link is correct and authentic.

In an advantageous embodiment of the method of the invention, it is provided that the plausibility check comprises a semantic testing of the link. Thus, for example, it is checked whether the different fields (protocol field, data field, etc.) are correctly bounded from one another. It can also be checked whether correct components are being addressed, for example, whether the field device to be serviced really exists or whether the network infrastructure as given in the link really exists.

In a preferred embodiment of the method of the invention, it is provided that as subcomponent of the established communication path a second communication network is used, especially a local network or the Internet, for connecting the client computer and the field access unit. The second communication network can, in such case, also be embodied as a radio network, for example, a WiFi network.

BRIEF DESCRIPTION OF THE DRAWINGS

The invention will now be explained in greater detail based on the appended drawing, the figures of which show as follows.

DETAILED DESCRIPTION

Figure 1:
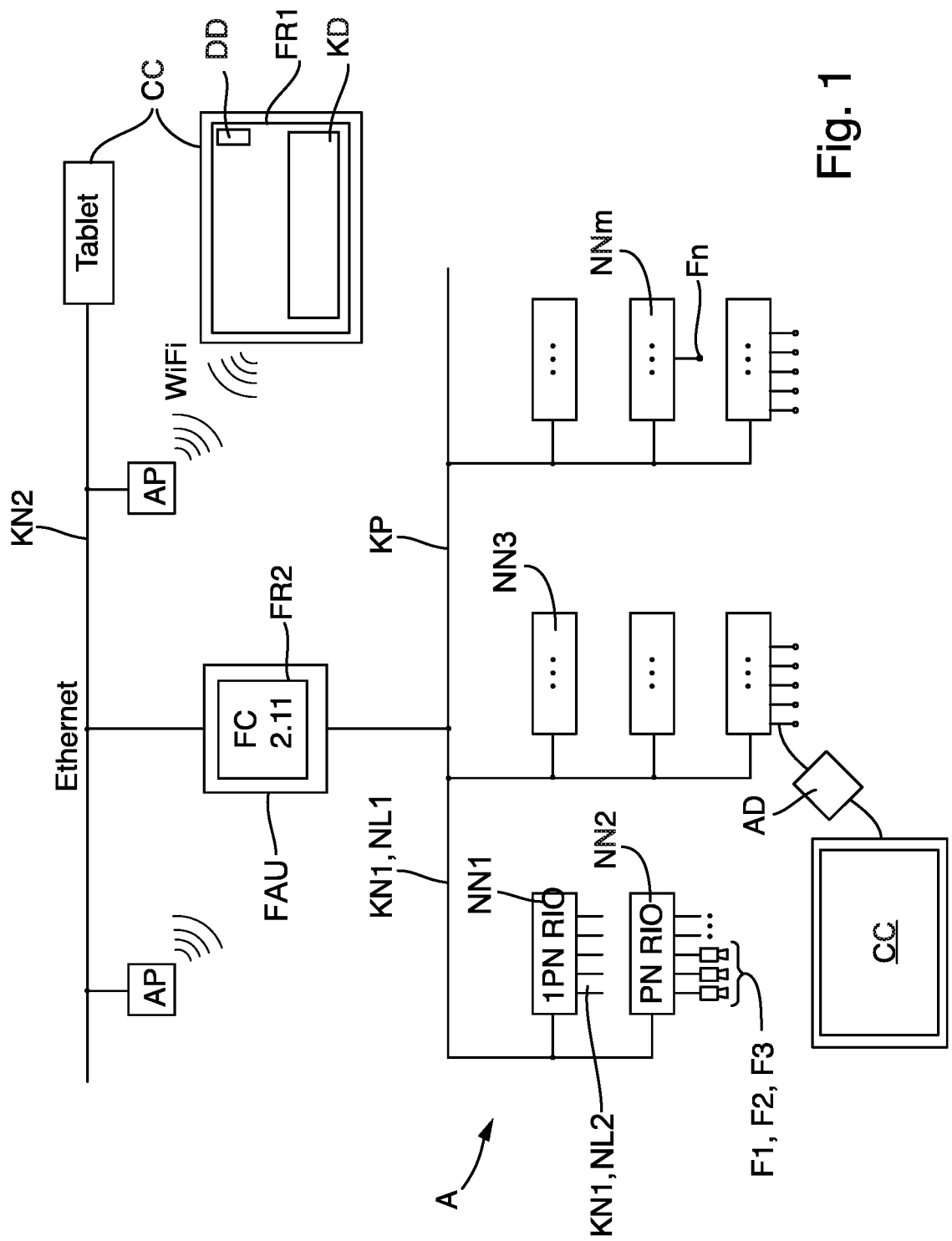
FIG. 1 shows a schematic view of a section of an automated plant.

FIG. 1 shows a schematic view of a section of a plant A of process automation. Connected to a first communication network KN1 are a number of field devices F1, F2, F3, ..., Fn. The first communication network KN1 is composed, in such case, of a number of network levels NL1, NL2.

Connected with one another in a first network level NL1 by means of a Profinet fieldbus are a number of network nodes NN1, NN2, NN3, ..., NNm in the form of remote-IOs. Connected to each of the network nodes NN1, NN2, NN3, ..., NNm by means of HART communication loops, each of which forms a second network level NL2, are numbers of field devices F1, F2, F3.

Connected to the first network level NL1 is a fieldbus access unit FAU. Such is, for example, a computer. Situated in the fieldbus access unit FAU is a second frame application, by means of which the individual field devices F1, F2, F3, ..., Fn can be serviced and/or monitored. By means of an additional interface, the fieldbus access unit is connected to an Ethernet network. This forms, for example, the network of the control level of the plant A. Connected to the Ethernet network are one or more access points AP. These allow access to the Ethernet network by means of wireless corrections, for example, WiFi.

For servicing the field devices F1, F2, F3, ..., Fn, supplementally a service unit in the form of a client computer CC can be used. For this, the client computer CC can be connected directly to a HART communication loop of a field device F1, F2, F3, ..., Fn. For this, a special adapter AD in the form of a HART modem is required. In this way, however, only one of the field devices F1, F2, F3, ..., Fn can be serviced at any one time.

Alternatively consequently, the client PC can be connected by means of a second communication network KN2 with the fieldbus access unit FAU. The second communication network is composed, in this case, of a WiFi-radio connection between the client computer CC and the fieldbus access unit FAU.

If the client computer knows the network address of a field device F1, F2, F3, ..., Fn, then it can access the field device F1, F2, F3, ..., Fn via the fieldbus access unit FAU. For this, the client computer has a first frame application FR1. With the help of a special communication driver KD, for example, the "YCommDTMs" available from the applicant for the frame application "Fieldcare" and used by the first frame application FR1, it is possible to access the second frame application FR2 of the fieldbus access unit FAU and via this to establish a communication path KP between client computer CC and field device F1, F2, F3, ..., Fn and to obtain access to the field device F1, F2, F3, ..., Fn. In this way, it is also possible to service and/or to monitor a number of field devices F1, F2, F3, ..., Fn simultaneously.

Figure 2:
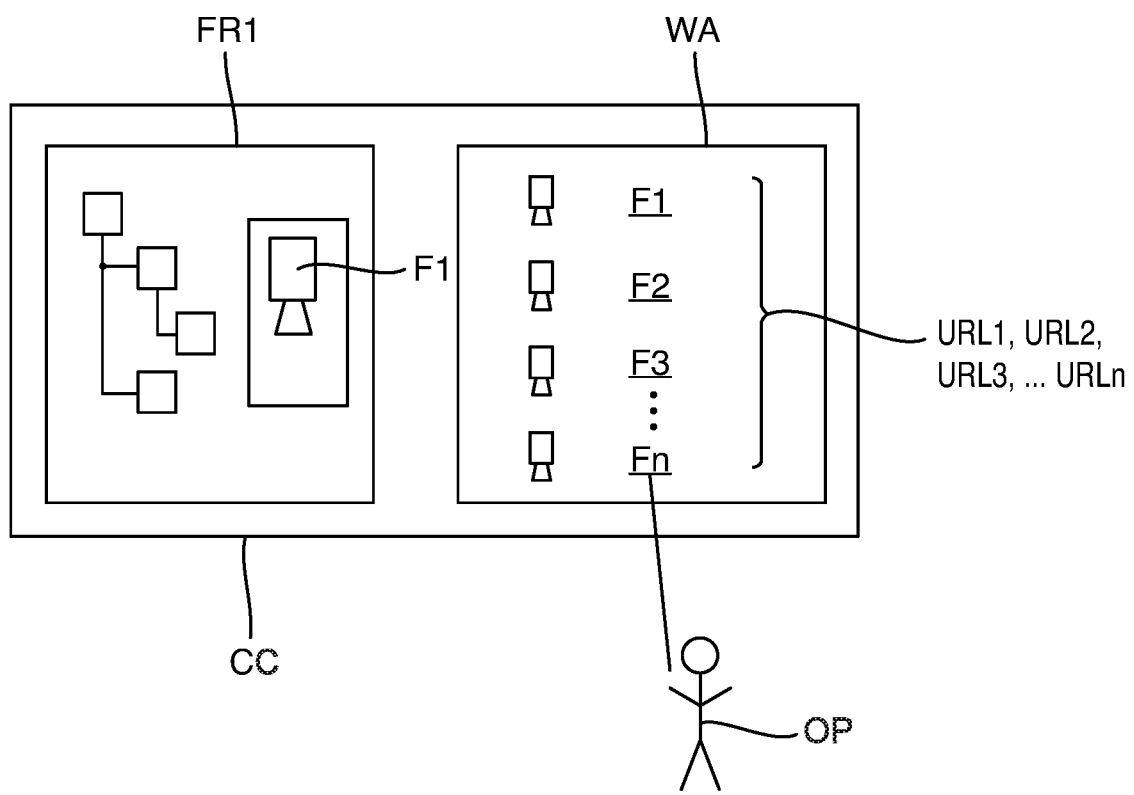
FIG. 2 shows an example of an embodiment of the method of the present disclosure.

FIG. 2 shows an example of an embodiment of the method of the invention. As already mentioned in the introductory part of the description, Web applications WA are frequently used in client computers CC for asset-management systems. These access remote servers, for example, so-called cloud servers, where the actual asset-management system is implemented (for example, the "W@M" system available from the applicant). For example, the application is opened in a browser of the client computer CC and provides in the browser content made available by the server. For example, the application displays all field devices F1, F2, F3, ..., Fn located in the plant A.

Until this invention, the communication path KP between client computer CC and field device F1, F2, F3, ..., Fn for servicing one of the field devices F1, F2, F3, ..., Fn had to be configured manually in the first frame application FR1. This was a complicated procedure.

In a first method step of the method of the invention, an operator OP opens the Web application in its client computer CC. Besides the indicated field devices F1, F2, F3, ..., Fn, links URL1, URL2, URL3, ... URLn are displayed. These links URL1, URL2, URL3, ... URLn are especially URL links. For connecting with one of the field devices F1, F2, F3, ..., Fn, the operator clicks the link URL1, URL2, URL3, ... URLn associated with the desired field device F1, F2, F3, ..., Fn.

In a second method step, the operating system of the client computer CC performs a plausibility check of the link URL1, URL2, URL3, ... URLn and tests especially its semantics.

If the plausibility check terminates successfully with an affirmative result, then the operating system in a third method step opens the first frame application FR1 set forth in the protocol field of the link URL1, URL2, URL3, ... URLn. For this, the name set forth in the protocol field of the link URL1, URL2, URL3, ... URLn must earlier have been linked in the registry of the operating system of the client computer CC with the first frame application FR1.

In a fourth method step, the link URL1, URL2, URL3, ... URLn is sent to the first frame application FR1. The first frame application parses the link URL1, URL2, URL3, ... URLn and extracts the information contained in the parameter field of the link URL1, URL2, URL3, ... URLn, for example, the network address or other identifier of the field device F1, F2, F3, ..., Fn.

This information is used, in order in a fifth method step to configure the communication path KP between client computer CC and field device F1, F2, F3, ..., Fn and to open an appropriate device driver DD in the first frame application FR1.

In a sixth method step, the field device F1, F2, F3, ..., Fn is serviced. For this, two variants are possible: On the one hand, the field device F1, F2, F3, ..., Fn can be serviced online. For this, the configured communication path KP is established, thus, activated. Then, the field device is F1, F2, F3, ..., Fn accessed live.

On the other hand, the field device F1, F2, F3, ..., Fn can be serviced offline. There is, thus, in this case, no communication connection to the field device F1, F2, F3, ..., Fn. The device driver DD has here, indeed, all servicing functionalities ready—these are, however, for lack of a connection to the field device F1, F2, F3, ..., Fn, however, still not performed on the intended field device F1, F2, F3, ..., Fn. The selected service functions are, however, stored in the device driver DD and transmitted to the field device F1, F2, F3, ..., Fn, as soon as the communication path KP is established between field device and client computer CC.

It can alternatively also be provided to select instead of the field device F1, F2, F3, ..., Fn a link URL1, URL2, URL3, ... URLn of a network node NN1, NN2, NN3, ..., NNm and to service that.

The invention claimed is:

1. A method for operating, installed in an automated plant, a field device that is connected for communication with a field access unit via a first communication network of a fieldbus of automation technology, the method comprising:
  invoking a link of the field device in a client computer, wherein the link is composed at least of a protocol field and a parameter field, wherein the invoking of the link initiates steps as follows:
    starting on the client computer a first frame application, including a Field Device Tool (FDT)-frame application, a Field Device Integration (FDI)-host, a Device Description (DD)-host, or an Electronic Device Description (EDD)-host, associated with the protocol field of the link;
    transferring the link to the first frame application on the client computer and extracting by the first frame application at least one piece of information contained in the parameter field;
configuring a communication path between the client computer and the field device via the field access unit using the at least one piece of information; and
opening a device driver associated with the field device, or a device description associated with the field device, in the first frame application on the client computer.

2. The method as claimed in claim 1, further comprising: establishing the configured communication path between the client computer and the field device; and servicing the field device with the first frame application via the established communication path, wherein the servicing includes a querying of data produced by the field device, a parametering, or re-parametering, of the field device, and a querying of diagnostic reports of the field device.

3. The method as claimed in claim 1, further comprising:
at a first point in time, placing service commands in the opened device driver and storing the service commands, wherein no connection between the field device and the client computer is present.

4. The method as claimed in claim 3, further comprising:
at a second point in time, establishing the configured communication path between the client computer and the field device and executing the service commands.

5. The method as claimed in claim 1, wherein the parameter field includes at least one of the following:
a network address of the field access unit; a network address of the field device; a network path of the field device; and an identifier of the field device.

6. The method as claimed in claim 1, wherein the link is invoked from a first Web application located in a remote server, from a second Web application executable via the Internet in the client computer, or from an application different from the first frame application and executable in the client computer.

7. The method as claimed in claim 6, wherein the link is invoked by a Web browser of the client computer.

8. The method as claimed in claim 1, wherein the link is invoked by opening a file executable in the client computer.

9. The method as claimed in claim 1, further comprising:
reading the link using the client computer from a Quick Response (QR)-code or from a Near Field Communication (NFC)-tag.

10. The method as claimed in claim 1, further comprising:
transferring first the at least one piece of information contained in the parameter field to an intermediate component which converts the at least one piece of information into a data format compatible with the first frame application; and transmitting the converted at least one piece of information from the intermediate component to the first frame application.

11. The method as claimed in claim 1, further comprising: starting a shell application in the client computer upon the invoking of the link, wherein the shell application initiates and coordinates the steps following the invoking of the link.

12. The method as claimed in claim 1, further comprising:
performing a plausibility check by the client computer after the invoking of the link, wherein the steps following the invoking of the link are performed only in the case that the plausibility was affirmative.

13. The method as claimed in claim 12, wherein the plausibility check comprises a semantic testing of the link.

14. The method as claimed in claim 1, wherein as a subcomponent of the configured communication path a second communication network is used for connecting the client computer and the field access unit.

* * * * *